United States Patent
Nielsen

(10) Patent No.: US 9,595,876 B2
(45) Date of Patent: Mar. 14, 2017

(54) DC-DC CONVERTER

(71) Applicant: SCHNEIDER ELECTRIC IT CORPORATION, West Kingston, RI (US)

(72) Inventor: Henning Roar Nielsen, Brenderup (DK)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 0 days.

(21) Appl. No.: 14/619,721

(22) Filed: Feb. 11, 2015

(65) Prior Publication Data

US 2016/0233776 A1    Aug. 11, 2016

(51) Int. Cl.
*H02M 3/335*    (2006.01)
*H02M 3/28*    (2006.01)

(52) U.S. Cl.
CPC .............................. *H02M 3/33546* (2013.01)

(58) Field of Classification Search
CPC ............... H02M 3/28; H02M 3/33507; H02M 3/33515; H02M 3/33523; H02M 3/33538; H02M 3/33553; H02M 3/33576
USPC ........ 363/15–17, 21.01–21.02, 21.04–21.09, 363/21.1, 21.11
See application file for complete search history.

(56) References Cited

U.S. PATENT DOCUMENTS

| | | | |
|---|---|---|---|
| 5,255,174 A | 10/1993 | Murugan | |
| 6,069,804 A | 5/2000 | Ingman et al. | |
| 6,243,277 B1 | 6/2001 | Sun et al. | |
| 7,518,886 B1* | 4/2009 | Lai | H02P 8/12 363/17 |
| 2002/0126517 A1* | 9/2002 | Matsukawa | H02M 3/33569 363/69 |
| 2007/0109825 A1* | 5/2007 | Qiu | H02M 3/156 363/41 |
| 2008/0197706 A1* | 8/2008 | Nielsen | H02J 1/102 307/66 |
| 2009/0231889 A1* | 9/2009 | Saint-Pierre | H02M 1/4208 363/44 |

(Continued)

OTHER PUBLICATIONS

Cha Dae (KR101249385 (B1), "Bidirectional DC/DC Converter System of Transformer Series Construction and Driving Method Thereof." Apr. 1, 2013.*

(Continued)

*Primary Examiner* — Timothy J Dole
*Assistant Examiner* — Sisay G Tiku
(74) *Attorney, Agent, or Firm* — Lando & Anastasi, LLP

(57) ABSTRACT

Power converters and methods of converting power are provided. In one aspect a converter includes an input to receive an input voltage having an input voltage value, an output, a first voltage bus, a midpoint, a first transformer having a primary and a secondary, a first circuit coupled to the input, coupled between the midpoint and the first voltage bus and coupled to the primary of the first transformer, an output circuit coupled to the secondary of the first transformer and coupled to the output, and a control circuit coupled to the first circuit and configured to control the first circuit to provide an AC voltage at the primary of the first transformer, wherein the control circuit is configured to control switches of the first circuit using a modified triangular waveform.

20 Claims, 9 Drawing Sheets

(56) References Cited

U.S. PATENT DOCUMENTS

| | | | | |
|---|---|---|---|---|
| 2011/0254528 A1* | 10/2011 | Danesh-Pajooh-Nejad | ............... | H02M 3/33584 323/311 |
| 2012/0092903 A1* | 4/2012 | Nania | ..................... | H02J 3/383 363/34 |
| 2012/0163035 A1* | 6/2012 | Song | ................. | H02M 3/33584 363/17 |
| 2015/0171756 A1* | 6/2015 | Wada | ................ | H02M 3/33523 363/21.18 |
| 2015/0280594 A1* | 10/2015 | Lin | ................... | H02M 3/33546 363/21.04 |

OTHER PUBLICATIONS

Notification of Transmittal of the International Search Report and the Written Opinion of the International Searching Authority from corresponding PCT/US2016/017473 dated Mar. 29, 2016.

\* cited by examiner

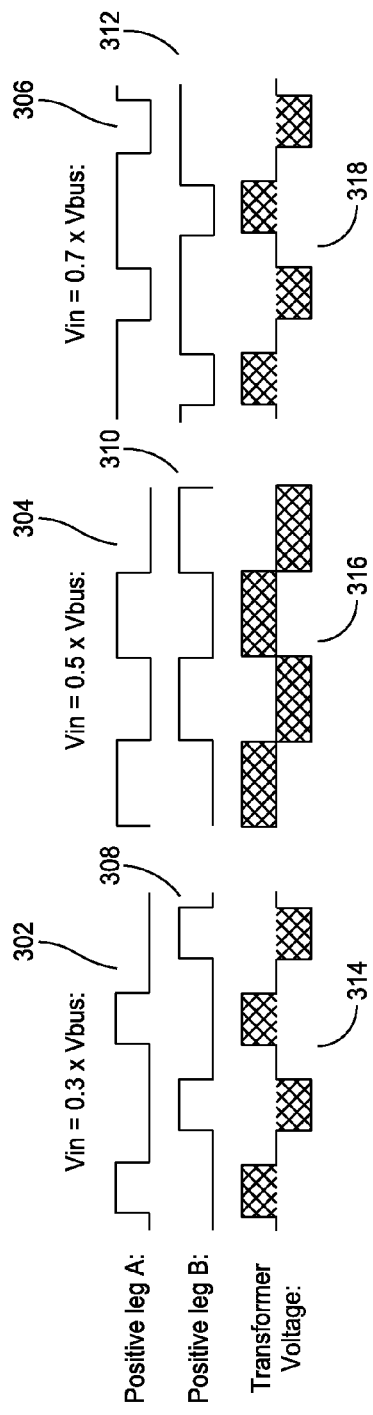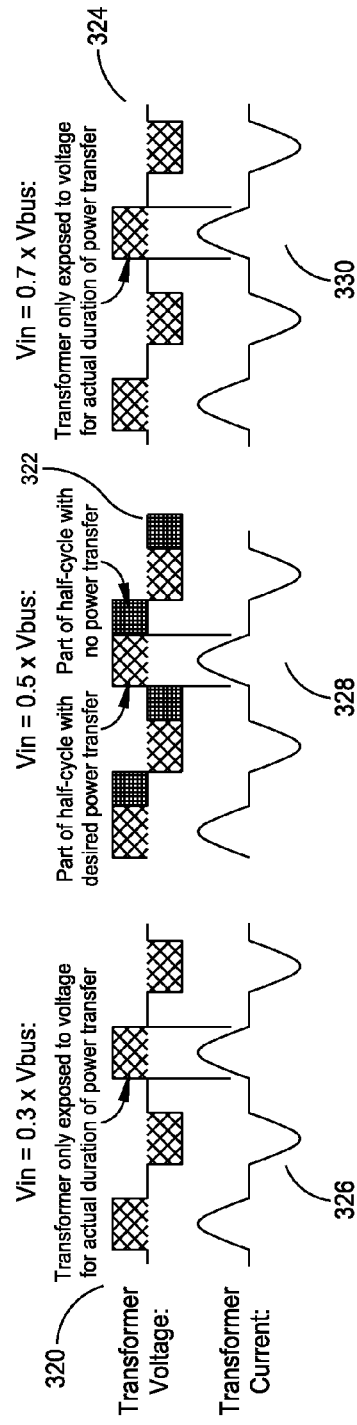
FIG. 3A
FIG. 3B

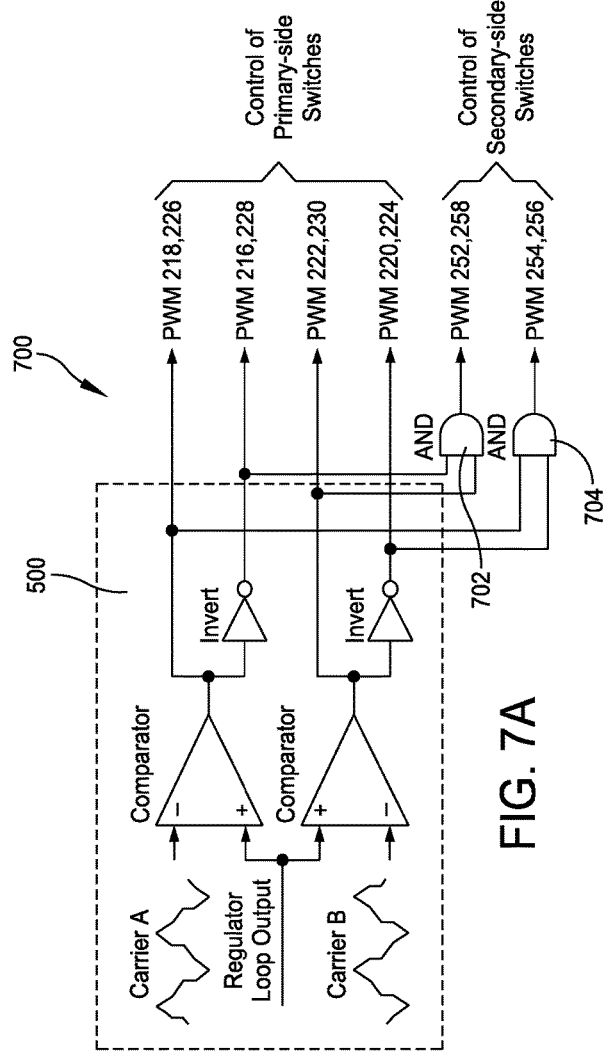
FIG. 7A
FIG. 7B
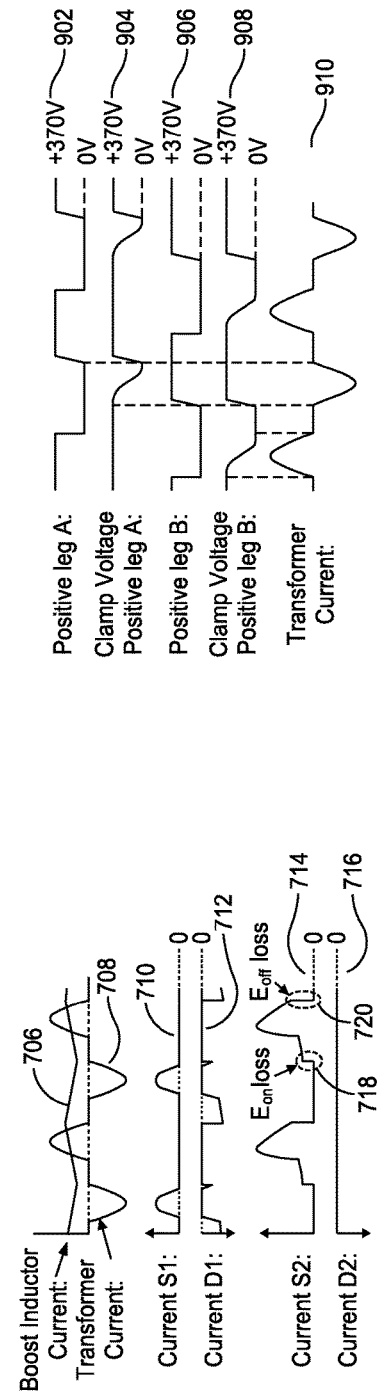
FIG. 9

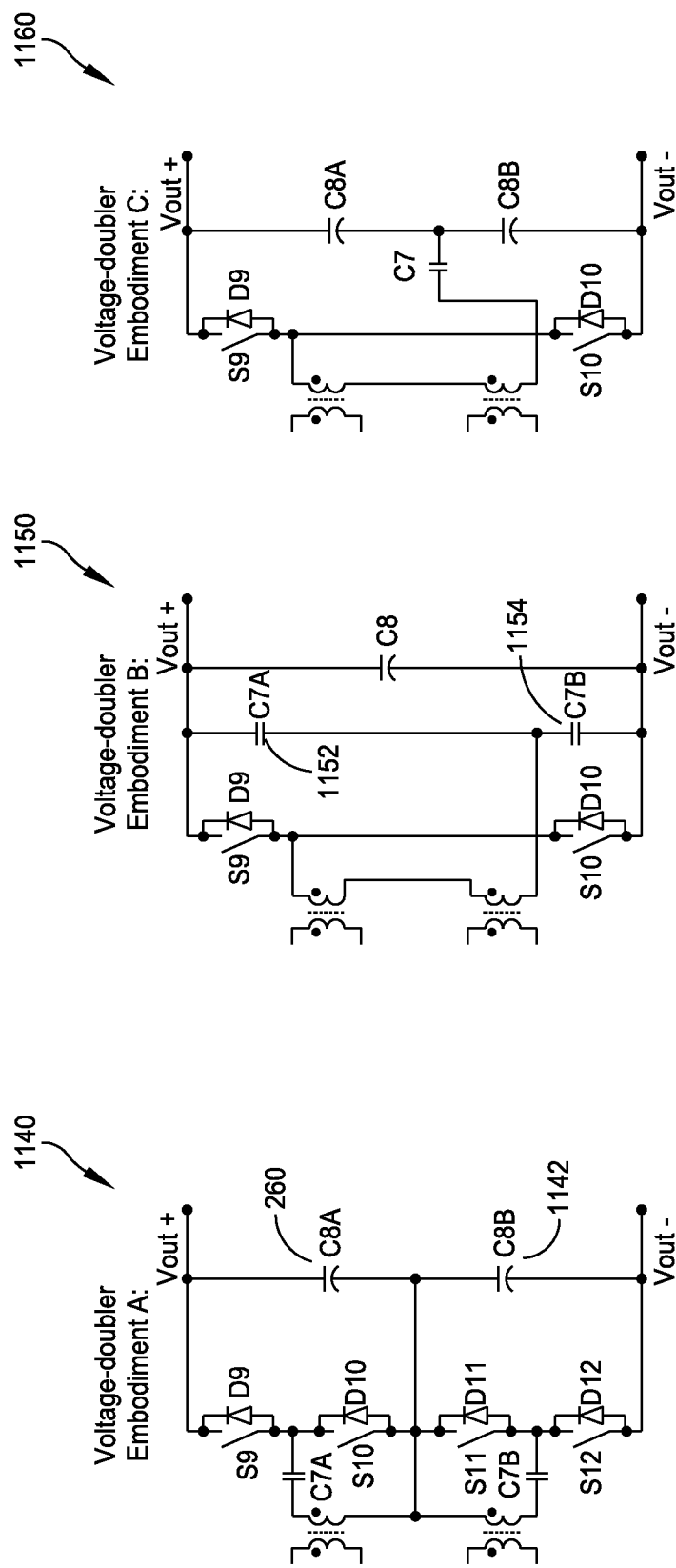

DC-DC CONVERTER

BACKGROUND

Technical Field

An Uninterruptible Power Supply (UPS) system and other power systems may include a DC-DC converter. At least some methods and systems described herein are directed to DC-DC converters that may be used in a power supply system, such as a UPS.

Background Discussion

An uninterruptible power supply is used to provide backup power to an electrical device, or load, when the primary power source, or mains, fails. Typical loads include computer systems, but other loads, such as heating/cooling/ventilation systems, lighting systems, network switches and routers, and security and data center management systems may also be powered by a UPS. A UPS designed for data center or industrial use may provide backup power for loads of between 1 kVA to multiple MVA for several hours.

A UPS unit typically includes one or more batteries as a power source when AC mains power is unavailable. DC power provided by the battery is converted to AC power by a power converter circuit, which in turn is provided to the load. A battery charger, which converts AC power to DC power, may be included in the UPS to charge the battery when AC mains is available to ensure that backup power will be available when needed. A UPS may also include a bi-directional DC-DC converter that is used to convert a voltage of a DC bus to a charging voltage, and may also be used to convert a DC battery voltage to that of the DC bus. The UPS may also include a control unit for automatically managing the operation of the UPS and the power conversion functions.

SUMMARY

A first aspect is directed to a converter. The converter includes an input to receive an input voltage having an input voltage value, an output, a first voltage bus, a midpoint, a first transformer having a primary and a secondary, a first circuit coupled to the input, coupled between the midpoint and the first voltage bus and coupled to the primary of the first transformer, an output circuit coupled to the secondary of the first transformer and coupled to the output, and a control circuit coupled to the first circuit and configured to control the first circuit to provide an AC voltage at the primary of the first transformer, wherein the control circuit is configured to control switches of the first circuit using a modified triangular waveform.

The converter may further include a second voltage bus, a second transformer having a primary and a secondary, a second circuit coupled to the input, coupled between the midpoint and the second voltage bus and coupled to the primary of the second transformer, wherein the secondary of the second transformer is coupled to the output circuit, and wherein the control circuit is coupled to the second circuit and configured to control switches of the second circuit using a modified triangular waveform. The control circuit may be configured to control the converter in a recharge mode of operation to generate a DC voltage at the input from a DC voltage at the output. In the converter, each of the first circuit and the second circuit may include a plurality of switch legs coupled between one of the first voltage bus and the second voltage bus and the midpoint. In the converter, each of the first transformer and the second transformer may have a one to one turn ratio. In the converter, an output DC voltage at the output may be substantially equal to twice the voltage from the first voltage bus to the midpoint, and the output may include a positive output, a negative output and a midpoint. In the converter, each of the plurality of legs may include an outer switch and an inner switch, with a capacitor coupled across each inner switch, and the converter may further include at least one passive discharge circuit coupled to at least one capacitor coupled across an inner switch, wherein the discharge circuit is configured to discharge the capacitor and reduce a turn-off loss associated with the inner switch.

Another aspect is directed to a voltage conversion method. The voltage conversion method includes receiving at an input an input DC voltage, the input DC voltage having a voltage value, creating a second voltage from the input voltage at a first voltage bus, generating a plurality of control signals using a modified triangular waveform, creating a first AC voltage from the second voltage using a first plurality of switches by controlling each of the first plurality of switches using one of the plurality of control signals, providing the first AC voltage at a primary of a first transformer, and generating an output voltage at an output from an AC voltage at a secondary of the first transformer.

The method may further include creating a third voltage from the input voltage at a second voltage bus, creating a second AC voltage from the third voltage using a second plurality of switches by controlling each of the second plurality of switches using one of the plurality of control signals, providing the second AC voltage at a primary of a second transformer, and generating an output voltage from an AC voltage at a secondary of the second transformer. The method may further include coupling a battery to the input and providing a voltage at the battery to charge the battery using the first plurality of switches from an input voltage at the output. The method may further include configuring the first plurality of switches as a plurality of switch legs coupled between the first voltage bus and a midpoint, and configuring the second plurality of switches as a plurality of switch legs coupled between the second voltage bus and the midpoint. In the method, each of the first transformer and the second transformer may have a one to one turn ratio. The method may further include providing a DC voltage at the output having a DC voltage value substantially equal to twice the voltage from the first voltage bus to the midpoint. In the method, the output may include a positive output, a negative output and a midpoint, and the method may further include providing a first output voltage from the positive output and the midpoint, and providing a second output voltage from the midpoint to the negative output. In the method, each of the plurality of legs may include an outer switch and an inner switch, with a capacitor coupled across each inner switch, and the method may further include discharging each capacitor of each inner switch to reduce a turn-off loss associated with each inner switch.

Another aspect is directed to a converter. The converter includes an input to receive an input voltage having an input voltage value, an output to provide an output voltage, a first voltage bus having a DC bus voltage value, a midpoint, a first transformer having a primary and a secondary, a first circuit coupled to the input, coupled between the midpoint and the first voltage bus and coupled to the primary of the first transformer, an output circuit coupled to the secondary of the first transformer and coupled to the output, and means for controlling the first circuit to generate a three level voltage waveform at the primary of the first transformer over a range of input voltage values.

In the converter, the range of input voltage values may extend from a value equal to 0.3 times the DC bus voltage value and 0.7 times the DC bus voltage value. The converter may further include means for operating the converter in a recharge mode of operation to generate a DC voltage at the input from a DC voltage at the output. In the converter, the first circuit may include a plurality of switch legs coupled between the first voltage bus and the midpoint, and each of the plurality of legs may include an outer switch and an inner switch, with a capacitor coupled across each inner switch, and the converter may further include means for discharging the capacitor and for reducing a turn-off loss associated with the inner switch.

Still other aspects, embodiments and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIGS. 3A and 3B show timing diagrams of control signals and resulting voltage and current waveforms in the DC-DC converter of FIG. 2;

FIG. 7A is a schematic diagram of logic circuitry used to generate control signals in accordance with one embodiment;

FIG. 7B shows current waveforms in a DC-DC converter in accordance with one embodiment;

FIG. 9 shows voltage and current waveforms in a DC-DC converter in accordance with one embodiment;

FIGS. 11A, 11B, 11C, 11D, 11E and 11F are schematic diagrams of embodiments of secondary circuits used in DC-DC converters in accordance with embodiments of the present invention.

DETAILED DESCRIPTION

Examples of the methods and systems discussed herein are not limited in application to the details of construction and the arrangement of components set forth in the following description or illustrated in the accompanying drawings. The methods and systems are capable of embodiment in other embodiments and of being practiced or of being carried out in various ways. Examples of specific embodiments are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

In at least some embodiments, including those described below with reference to FIG. 1, a UPS is provided having a cascaded multilevel architecture. Using this architecture, a UPS can be provided having a high output voltage (greater than 1 kV phase-phase) without the use of high voltage components. At least some inverters and UPS's disclosed herein can provide output voltages in the range of 2.3 to 6.6 kV. Without the use of the cascaded multilevel technology, a single stage inverter having such a high output voltage would typically require very high voltage rated components, which are rare and expensive (such as IGBT's rated for several kV). Using the cascaded multilevel architecture, several inverters can be connected in series to provide an overall high output voltage while using more common, and less expensive, IGBT's having a 1200V rating.

Figure 1:
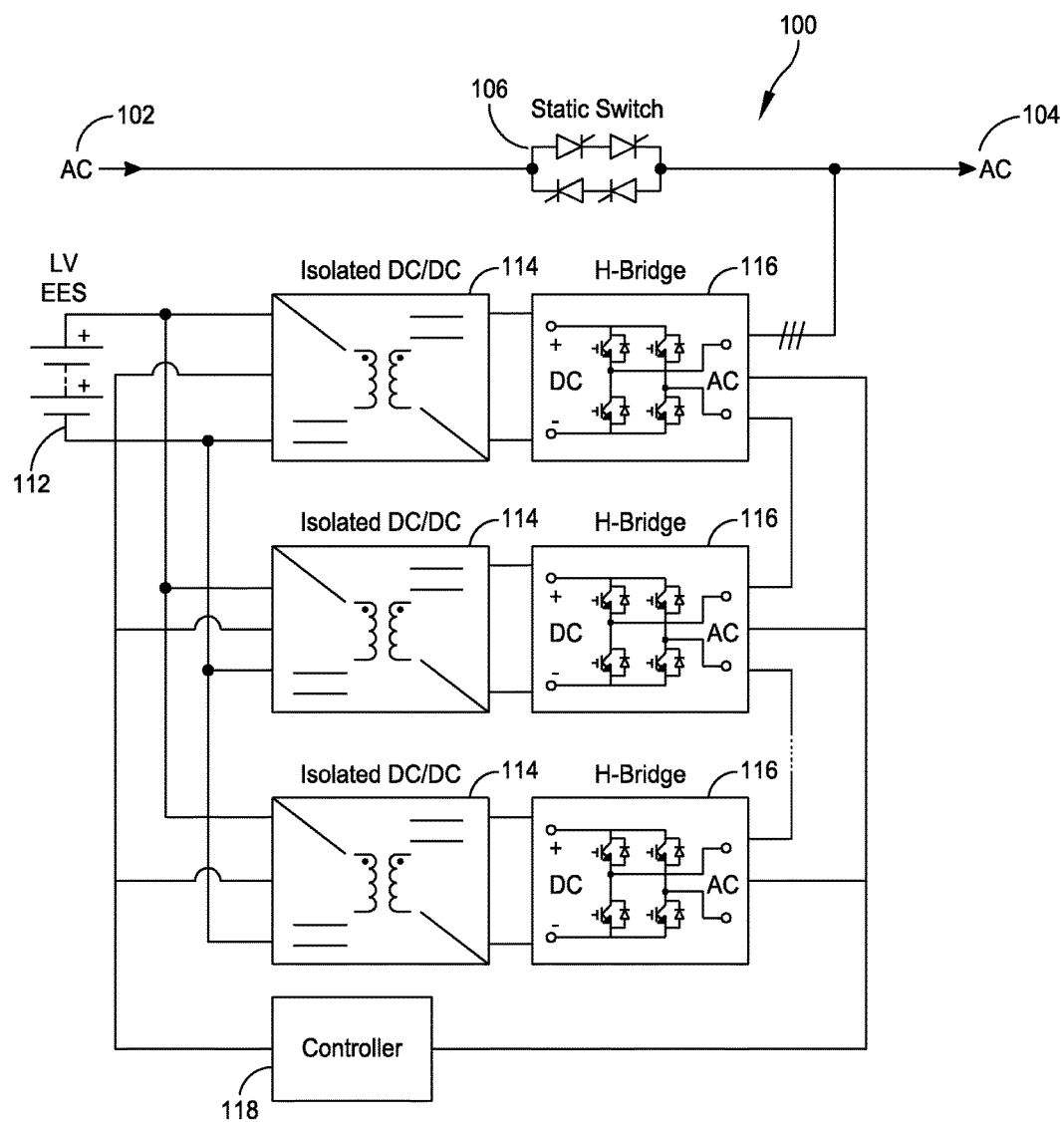
FIG. 1 is a block diagram of an uninterruptible power supply (UPS) system, according to one embodiment.

FIG. 1 provides a functional block diagram of an off-line UPS 100 in accordance with at least one embodiment. The UPS 100 has an AC input 102, an AC output 104 with a static switch 106 between the AC input and the AC output. The UPS 100 also includes a battery 112, DC/DC converters 114, H-bridge modules 116 and a controller 118.

The controller is coupled to each of the DC/DC power modules and the H-bridge modules and, although not shown in FIG. 1, is also coupled to the static switch. The controller controls operation of the UPS 100 as described in further detail below. Each of the DC/DC converters 114 is coupled between the battery 112 and an associated one of the H-bridge modules 116. Each of the H-bridge modules is also coupled to the AC output.

The UPS 100 shown in FIG. 1 has three DC/DC converters 114 and three H-bridge modules 116. In other embodiments there may be more or less DC/DC converters and H-bridge modules depending on total power and voltage required from the UPS 100. Further, the battery 112 is shown as two separate batteries coupled together. In other embodiments, more or less batteries may be included within one battery module coupled in series and/or parallel to provide a desired battery output voltage level.

As will now be described, the UPS 100 can operate in one of two operational modes, normal mode or back-up mode. In normal mode of operation, the static switch 106 is closed to provide AC power at the input 102 to the output 104 to provide power to a load. Also in normal mode of operation, input AC power is provided to the series connection of the H-bridge modules 116. Each of the H-bridge modules rectifies the AC power and provides DC power to one of the DC/DC converters 114. Each of the DC/DC converters, under the control of the controller 118, provides regulated DC voltage to the battery 112 to charge the battery 112.

The controller 118 may be a digital controller, e.g., digital signal processor, complex programmable logic controller, microcontroller, or other appropriate digital platform. In another embodiment, the controller 118 may be an analog controller, such as a hysteresis current controller. In yet another embodiment, the controller 118 may be a combination digital and analog controller.

Back-up mode of operation occurs when AC power at the input is either unavailable or a brown-out condition exists where AC power is available but not of satisfactory quality. In back-up mode of operation, AC power at the output 104 is derived from DC power provided by the battery 112. The DC/DC converters receive the DC power from the battery and provide an output DC voltage at the output of the DC/DC converters. Each of the DC converters provides galvanic isolation between its input and its output using one or more transformers. The H-bridge modules operate as inverters in the back up mode of operation and receive the DC voltage from the DC/DC converters and provide regulated AC power to the output of the UPS.

UPS's having the topology of UPS 100 are generally known. In prior UPS's, it is typically difficult to obtain cost-effective bidirectional performance allowing combined battery discharging and recharging through the same converter. Further, in known UPS's of this type, high losses may result from the use of a triple conversion power train that includes a first DC/AC conversion, a medium frequency transformer, a rectifier stage and a final 50/60 Hz inverter.

As will be described in further detail below, at least some embodiments of UPS's disclosed herein overcome problems associated with typical cascaded multilevel offline UPS's.

More particularly, at least some embodiments provide improved DC/DC converters for use in an offline UPS's and in other power systems.

Figure 2:
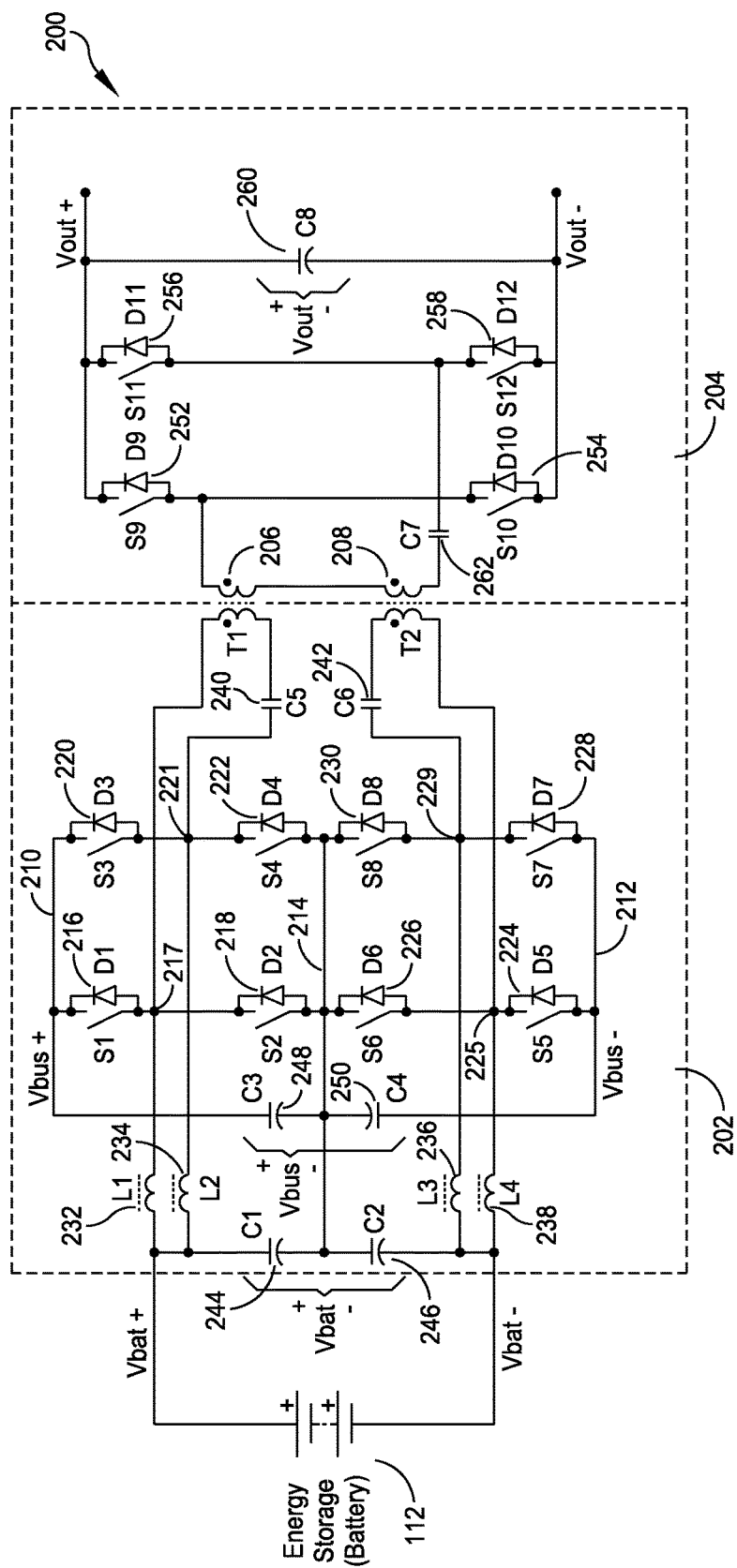
FIG. 2 is a schematic diagram of a DC-DC converter in accordance with one embodiment.

FIG. 2 provides a schematic diagram showing an isolated DC/DC converter 200 in accordance with one embodiment. The DC-DC converter 200 is a bidirectional DC-DC converter and can be used in the UPS 100 as the converter 114. The DC-DC converter 200 is shown coupled to the battery 112 of FIG. 1. The DC-DC converter includes a DC-AC section 202 and an AC-DC section 204. The DC-AC section is coupled to the AC-DC section using a pair of transformers 206 and 208 each having a primary side coupled to the DC-AC converter 210 and a secondary side coupled to the AC-DC converter 204. The secondary sides of transformers 206 and 208 are coupled in series.

The DC-DC converter 200 has a split bus architecture and includes a positive bus 210, a negative bus 212 and a midpoint 214. Two half-bridge switch legs are coupled across a positive side of the split bus architecture and two half-bridge switch legs are coupled across a negative side of the split bus architecture. A first positive half-bridge includes two series coupled transistors 216 and 218 coupled between the positive bus 210 and the midpoint 212. A second positive half-bridge includes two series coupled transistors 220 and 222 coupled between the positive bus 210 and the midpoint 212. A midpoint 217 between transistors 216 and 218 of the first positive half bridge is coupled to the positive side of the battery 112 through an inductor 232. A midpoint 221 between transistors 220 and 222 of the second positive half bridge is coupled to the positive side of the battery 112 through an inductor 234. The midpoint 217 is also coupled to a first side of the primary of transformer 206, and the midpoint 221 is also coupled to a second side of the primary of transformer 206 through a capacitor 240.

A midpoint 225 between transistors 224 and 226 of the first negative half bridge is coupled to the negative side of the battery 112 through an inductor 238. A midpoint 229 between transistors 228 and 230 of the second negative half bridge is coupled to the negative side of the battery 112 through an inductor 236. The midpoint 225 is also coupled to a first side of the primary of transformer 208, and the midpoint 229 is also coupled to a second side of the primary of transformer 208 through a capacitor 242.

The DC-DC converter 200 also includes capacitors 244, 246, 248 and 250. Capacitor 244 is coupled between the positive side of the battery 112 and the midpoint 214. Capacitor 246 is coupled between the negative side of the battery 112 and the midpoint 214. Capacitor 248 is coupled between the positive bus 210 and the midpoint 214, and capacitor 250 is coupled between the negative bus 212 and the midpoint 214.

The AC to DC section 204 of the DC-DC converter 200 includes four transistors 252, 254, 256 and 258, an output capacitor 260, and a DC blocking capacitor 262. The transistors are coupled as an H-bridge to generate the output DC voltage across capacitor 260 in discharge mode of the DC-DC converter 200 from AC voltage across the transformers 206 and 208, and to generate an AC voltage across transformers 206 and 208 in recharging mode of the DC-DC converter 200 from DC voltage across capacitor 260.

In one embodiment, the transistors 252, 254, 256 and 258 are only switched on in recharging mode of the DC-DC converter, and in discharge mode, the transistors are not controlled but rather embedded diodes in the transistors function as a passive rectifier. In one embodiment, the discharge mode of operation of the DC-DC converter is a higher power mode of operation than the recharge mode of operation due to typical battery rated recharge capabilities. Operation of the H-bridge as a passive rectifier in the discharge mode reduces the need for heat sinks with the transistors as there are no transistor conduction or switching losses in the discharge mode.

In another embodiment, of a bidirectional converter, in which the recharge mode is not used, the transistors 252, 254, 256 and 258 of the AC-DC converter 204 are replaced by diodes.

In the embodiment shown in FIG. 2, the use of the split DC bus reduces the voltage stress across each leg of the half-bridge switch legs. In one embodiment, in which the battery voltage is 480V, the voltage of the positive bus with respect to the midpoint is +370V, and the voltage of the negative bus with respect to the midpoint is −370V. Without the use of the split bus architecture, 1200 V IGBT's would typically be required for the primary side switches, however, the use of the split bus allows 600V or 650V IGBT's to be used reducing cost and switching losses.

The DC-DC converter 200 described above includes two transformers 206 and 208. In one embodiment each of these transformers is substantially the same and each has a 1:1 turns ratio. The primary of transformer 206 is coupled between the two positive legs, and the primary of transformer 208 is coupled between the two negative legs. A capacitor 240 is included in the primary path of transformer 206 and a capacitor 242 is included in the primary path of transformer 208. The secondary windings of transformers 206 and 208 are coupled in series and are coupled in series with a capacitor 262.

Each of the positive and negative half bridge circuits are configured as boost converter legs with an inductor (232, 234, 236, 238) coupled between a terminal of the energy storage device and midpoints of the legs. The two switches of each leg are controlled by complementary Pulse Width Modulation (PWM) signals so that one switch is on while the other switch is off. In one embodiment, for safe operation, the two complementary PWM signals are separated by a small dead-time to ensure that the switches are not simultaneously on. In one embodiment, the dead-time is equal to a few micro-seconds, however in other embodiments the dead time may be different.

During operation of the converter 200 of FIG. 2, a split of voltages can be assumed so that half of the battery voltage will appear across each of capacitors 244 and 246. The PWM signals from the controller are used to control the switches of the legs to maintain a constant voltage Vbus+ across capacitor 248 and Vbus− across capacitor 250 regardless of incoming battery voltage and changes in the load.

In one embodiment, with the use of transformers having a 1:1 turns ratio and passive diode rectification on the secondary side, the output voltage Vout+, which is the voltage difference between the nodes Vout+ and Vout−, is almost equal to Vbus+ which is the voltage difference between Vbus+ and Vbus− except for minor voltage drops caused by the semiconductors and the impedance of the transformers. Because of the strong connection between Vbus and Vout, control of the converter can be achieved by monitoring the primary side, the secondary side or some combination of both the primary side and the secondary side. In one embodiment, the output voltage of the converter 200 is used to control the operation of the converter. In this embodiment a feedback signal based on the output voltage is provided to the controller to control the PWM signals. Also, in this embodiment, galvanic isolation for the feedback signal is provided to maintain isolation between the primary and the secondary. In other embodiments output current and or output voltage may be used to monitor the operation of the converter and generate one or more feedback signals. In one embodiment, the primary side bus voltage is maintained at 740V (+/−370) to provide an output voltage of 740V at no load and approximately 720V full load.

In some conventional DC/DC converters the legs feeding a transformer are switched at a 50% duty-cycle so that a symmetrical waveform across the windings is obtained. In at least some embodiments disclosed herein the duty-cycles of the switches are not fixed at 50%, but are variable depending on the input voltage from the energy storage device. For boost converters, the duty-cycle D of the boost switches has the following relationship between input voltage and output voltage:

$$D_{boost}=1-(V_{in}/V_{out}).$$

For the converter shown in FIG. 2, the above duty-cycle formula will be valid for the switches 218, 222, 226, 228 which are located closest to the DC bus midpoint, as these switches can be considered the "boost switches". Accordingly, due to the complementary control method, the duty-cycles of the remaining switches will have duty cycles of 1−Dboost, excluding any "dead time". Accordingly, for at least one embodiment, the duty-cycles of the eight switches will be as follows:

$$D_{218}, D_{222}, D_{226}, D_{230}=1-(V_{bat}/V_{bus}).$$

$$D_{216}, D_{220}, D_{224}, D_{228}=V_{bat}/V_{bus}$$

In some embodiments, best performance of the converter can be obtained when duty-cycles are kept relatively close to 0.5 (50%). In embodiments to be used with energy storage sources having a very wide voltage range, the ratio of min/max duty-cycle is large and the min and max duty cycles should be symmetrically placed around 0.5. In one embodiment, the range of input voltage (battery voltage) is chosen to be 30 to 70% of bus voltage. This leads to duty-cycles ranging from 0.30 to 0.70 as shown in table 1.

TABLE 1

| Input Voltage | Bus Voltage | $D_{218}$, $D_{222}$, $D_{226}$, $D_{230}$ | $D_{216}$, $D_{220}$, $D_{224}$, $D_{228}$ |
| --- | --- | --- | --- |
| 222 V | 740 V | 0.70 | 0.30 |
| 370 V | 740 V | 0.50 | 0.50 |
| 518 V | 740 V | 0.30 | 0.70 |

For classical H-bridge DC/DC converters, the two legs feeding the transformer are typically switched in simple counter-phase (180 degrees phase displaced). In at least some embodiments of converters discussed herein, a control scheme is used with a varying phase shift as a function of duty-cycle. This control scheme will now be described.

A control scheme using a constant phase shift of 180 degrees uses control signals as shown in FIG. 3A and produces the transformer voltage (ignoring the voltage across the series capacitors) shown in FIG. 3A. More specifically, FIG. 3A shows the control pulses 302, 304, 306, 308, 310 and 312 used for each of the positive legs of a converter for three input voltage conditions, Vin=0.3×Vbus, Vin=0.5×Vbus, and Vin=0.7×Vbus. FIG. 3A also shows the voltage waveforms 314, 316 and 318 for the positive transformer for the three input voltage conditions.

As shown, the voltage waveform across the transformer changes from a 2-level waveform when the duty-cycle is 0.5 to a 3-level waveform (zero volts for parts of a cycle) at high and low input voltages. This affects the sizing (optimal value) of the series capacitors that are coupled in series with the primary and secondary windings. The main purpose of these capacitors is to cancel the voltage drop caused by leakage inductance (stray inductance) of the transformer by creating a series-resonance tank. In at least one control method used in embodiments described herein that have varying duty-cycles, the resonance frequency is not chosen directly at the switching frequency but instead is slightly increased so that half-cycles of a resonance oscillation is completed within the part of a switch cycle where voltage is actually present across the windings. Tuning the resonance frequency in this way enables an almost constant output voltage for any of the three transformer voltages shown in FIG. 3A, whereas the traditional tuning of resonance directly to the PWM frequency would cause output voltage to vary significantly as a function of the transformer voltage waveform.

In at least one embodiment, the optimum resonance frequency $f_{res}$ is determined using the equation below.

$$f_{res}(\text{optimum}) = f_{PWM} * 0.5/D_{min}$$

In the equation above $D_{min}$ is the lowest used duty-cycle, which as described above is 0.3 in at least some embodiments. The resonance frequency $F_{res}$ can be determined using the equation below.

$$F_{res} = 1/(2*\pi*\sqrt{(L_{res} \times C_{res})})$$

In the equation above, $L_{res}$ is equal to two times the leakage inductance of one transformer seen from the secondary (with two transformers in series as shown in FIG. 2) and $C_{res}$ is equivalent to the series connection of capacitors 240, 242 and 262. In another embodiment, the series capacitors on both the primary side and the secondary side of the transformer are replaced by only series capacitance on either the primary side or the secondary side. In addition to being used to tune the resonance frequency, the capacitors serve a second purpose of avoiding DC current through the transformer windings which potentially could lead to core saturation. This second purpose is more critical when un-gapped, high permeability cores such as ferrite are used. Without the use of the series capacitors, transformer DC currents could occur as result of inaccurate timing (small differences in duty-cycle) of either primary or secondary side switches.

In one embodiment, the switching frequency for the converter 200 is chosen to be 16 kHz, although other frequencies may be used. In this embodiment, the series capacitors are tuned to match a duty-cycle range down to 0.3 which using the formulas above results in a resonance frequency of 26.7 kHz.

FIG. 3B shows the voltage waveforms 320, 322 and 324 for three different input voltages and also shown in FIG. 3B is the corresponding transformer current waveforms 326, 328 and 330. As shown in FIG. 3B with the resonance frequency tuned higher than the switching frequency, when the input voltage is equal to half the bus voltage, during part of the non-zero voltage waveform, there is power transfer, and during part of the non-zero voltage waveform there is no power transfer. Without additional control used in some embodiments described below, this will result in higher transformer rms current since the effective duty cycle is less. Without the use of control methods described below, this could require use of larger transformers. In these control methods, the VA-rating (Volt-Ampere product) of the transformers can be approximately the same as for typical designs in which the resonance frequency is equal to the switching frequency. The VA rating of a transformer is related to its physical size, weight and cost.

In at least some embodiments which will now be described, significantly reduced voltage and constant current waveforms for the transformers can be achieved over the complete input voltage range. More specifically, the control method changes the voltage waveform to appear as a 3-level waveform with the same amplitude and duty-cycle for any input voltage rather than having a 2-level waveform at D=0.5 as described above with reference to FIG. 3B. In these embodiments, the portion of the transformer voltage waveform 322 at D=0.5 (shown dark-shaded in FIG. 3B) is reduced or even eliminated. In at least one embodiment, the use of the control method reduces the average voltage (or Volt-Second area) by a factor of 0.6 to 0.8.

In a transformer, the average voltage (rather than the rms voltage) dictates the peak flux density of the transformer's core and therefore, to a large extent, determines the core loss. The actual transformer voltage waveform (e.g. 3-level versus 2-level) influences the harmonic content of voltage and flux, but plays a less significant role for core losses. When operating ferrite cores at 16 kHz the final core volume of the transformers may be determined based on a desired margin to the saturation peak flux level rather than a specific core loss per volume, as long as the core losses are acceptable from thermal and efficiency point-of-views. Accordingly, using methods described herein, the transformer VA-rating for the transformers in the converter 200 (based on rms value of current and average value of voltage) may be altered compared to prior art designs resulting in smaller and lower cost transformers.

In typical converter designs, triangular or trapezoidal waveforms are used in conjunction with an output current or voltage feedback signal to provide PWM control of the switches in the converter. In at least some embodiments described herein, a more complex carrier waveform is used in the controller of the converter in place of the triangular or trapezoidal waveforms to generate control signals for the switches of the converter 200.

Typical PWM modulation methods use a comparator with one input receiving a triangular or trapezoidal waveform and the other input receiving a signal from a voltage or current control loop. The output of the comparator is used to create PWM control signals.

Figure 4:
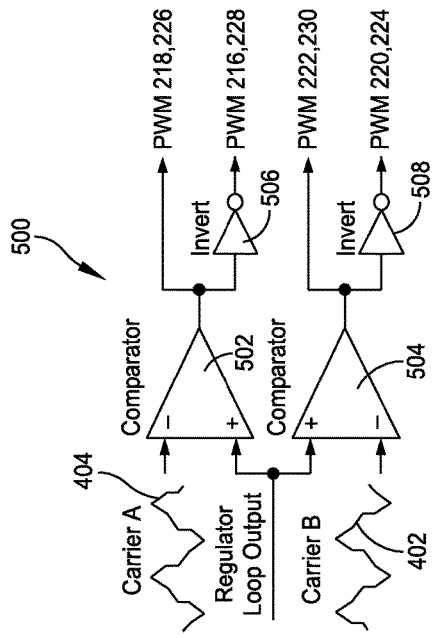
FIG. 4 shows a waveform used to generate control signals for the DC-DC converter in accordance with one embodiment.

In one embodiment, a modified carrier waveform provides a phase shift of the two legs of the converter when the duty cycle D=0.5 resulting in a 3-level voltage waveform. The phase shift is gradually reduced to zero when the duty-cycle D approaches the chosen minimum or maximum values, which in at least some embodiments described herein is equal to 0.3 or 0.7. FIG. 4 shows a graph 400 of the proposed carrier waveforms 402 and 404 (separate waveform for the two legs feeding the same transformer) over a complete cycle. The graph shows relative amplitude verses phase. In one embodiment, the waveforms may be slightly modified to provide dead zones to ensure that the two legs are not simultaneously turned on.

The waveforms 402 and 404 are similar in some aspects to traditional triangular PWM waveforms but have been modified over portions of the waveform to have areas 406 of infinite slope and areas 408 where the slope is half of that of a triangular waveform. The waveforms 402 and 404 may be replaced by similar modified waveforms that serve the same purpose. The waveforms 402 and 404 are referred to herein as modified triangular waveforms to indicate that the waveforms do not follow a triangular shape over a complete cycle.

Figure 5:
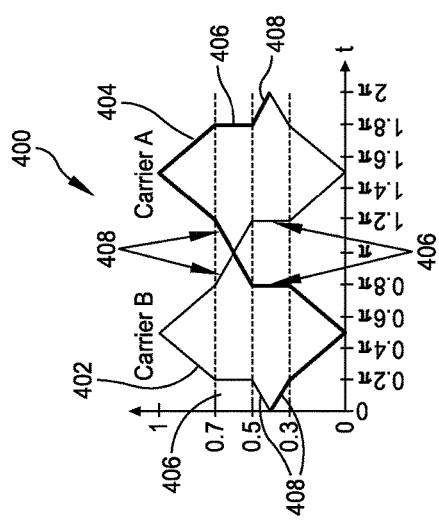
FIG. 5 is a schematic diagram of logic circuitry used to generate control signals in accordance with one embodiment.

FIG. 5 shows a simplified block diagram of a control circuit 500 of a control scheme for producing PWM control signals for a converter such as converter 200. The control scheme uses a pair of comparators 502 and 504 along with a pair of inverters 506 and 508 to produce the PWM control signals for the switches 218, 220, 222, 224, 226, 228, 230 of the converter 200. The comparators 502 and 504 compare signals having the waveforms 402 and 404 with a regulator circuit output for the converter 200. The comparators provide output control signals which are either provided to switches of the converter 200 or are inverted using the inverters 506 and 508 prior to being provided to switches.

Figure 6:
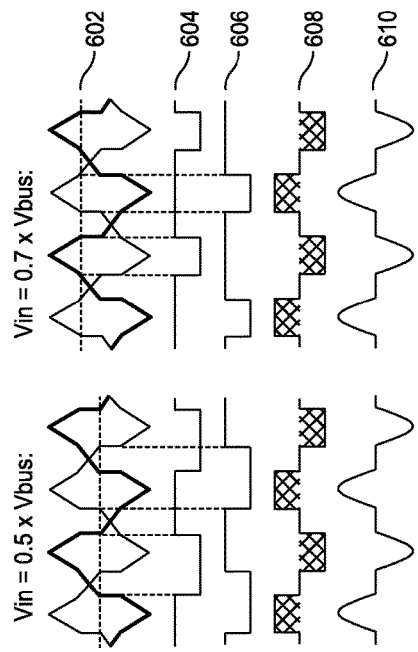
FIG. 6 shows waveforms of control signals and resulting voltages and currents in a DC-DC converter in accordance with one embodiment.

FIG. 6 is a series of graphs 602, 604, 606, 608 and 610 showing the relative timing between control signals and transformer voltage and transformer current for the converter 200 for the same three input voltage conditions, Vin=0.3×Vbus, Vin=0.5×Vbus, and Vin=0.7×Vbus as discussed above with reference to FIG. 3A. The same control signals and resulting voltage and current waveforms are applicable for each of the transformers 206 and 208. Graph 602 shows the waveforms 402 and 404 discussed above with reference to FIG. 4. Graphs 604 and 606 show the control signals generated for the legs of the converter 200 using the control scheme from FIG. 5. Graph 608 shows the transformer voltage, and Graph 610 shows the transformer current 610. As shown in FIG. 6, the use of the waveforms 402 and 404 results in the transformer voltages having a 3-level waveform for all three input voltage conditions shown.

In at least some embodiments, the use of the waveforms 402 and 404 results in not having exact 180 degree interleaving of the converter legs as is typically provided in legacy converters using triangular waveforms. To prevent increased ripple current at the input of the converter 200 as a result of not having exact interleaving, the size of the capacitors 244 and 246 is increased in some embodiments. The cost and size considerations of increasing the values of these capacitors is minor compared to the gains that can be received over prior converters by reducing the VA rating of the transformers 206 and 208.

In at least some embodiments, as discussed above, the four legs of the converter 200 are operated in a balanced symmetrical pattern so that when one node of the converter 200 is switched in a positive direction, another node is switched at the same time in the opposite direction. This mode of operation reduces common mode voltage coupling from the primary to the secondary of the transformers 206 and 208 due to coupling capacitance in the transformers.

The use of transformers having a one-to-one turn ratio in at least some embodiments provides additional advantages. In particular, because of the one-to-one turn ratio, simple coaxial type transformers may be used. Coaxial type transformers provide good magnetic coupling with relatively low capacitive coupling, and coaxial transformers can be designed relatively easily to withstand high operating voltages and transient voltages.

In the embodiment shown in FIG. 2, bidirectional operation of the converter 200 is obtained by use of switches 252, 254, 256 and 258 on the secondary side rather than just diodes. In one embodiment, control signals for these switches are generated using the control circuit 700 shown in FIG. 7. The control circuit 700 includes the control circuit 500 discussed above with regard to FIG. 5 and includes two additional AND gates 702 and 704 each configured to receive two of the four control signals from the output of control circuit 500. The outputs of gates 702 and 704 provide the control signals for switches 252, 254, 256 and 258.

The use of the control signals in the manner shown, along with the use of one-to-one ratios for the transformers, results in the primary-side and secondary side DC busses (respectively $V_{bus}$ and $V_{out}$) becoming "locked" to about the same voltage (within a few percent) for any direction of power flow. In reverse mode of operation (battery recharging) of the converter 200 a first control loop maintains a fixed voltage as $V_{out}$ so that the secondary side can be considered as an ideal voltage source. Approximately the same voltage will be "mirrored" to the primary side so that the legs of the converter 200 can operate as a buck-converter and transfer energy back to the battery.

In one embodiment, the switches 252, 254, 256 and 258 are implemented using 1200V IGBT's. Although IGBT's are not typically well suited for switching at a frequency of 16 kHz as used in some embodiments, these switches are operated under zero-current switching (ZCS), so that switching losses are significantly reduced or even negligible. In reverse mode of operation, there is no current in the secondary-side free-wheeling diodes of switches 252, 254, 256 and 258.

Highest possible efficiency for the converter 200 is obtained when instantaneous power flow through the transformers is kept strictly unidirectional e.g. from battery towards output. To achieve this, for a given instantaneous polarity of transformer voltage, the current should never change to opposite polarity as this causes an unwanted reverse power flow requiring even more "forward" power flow to compensate for it. When introducing switches on the secondary side (rather than just diodes) and controlling them by the simple scheme of FIG. 7A, there is a potential risk of small portions of reverse power flow within each switch cycle if a half-cycle of resonant becomes shorter than the on-state time of the secondary switches. In one embodiment, to prevent this from occurring, some of the switches of the converter are disabled depending on the desired direction of power flow. In this embodiment, during battery discharge mode, switches 252, 254, 256 and 258 are disabled, and during battery recharge mode, switches 218, 222, 226 and 230 are disabled. In the recharge mode, with the switches disabled the remaining switches operate as a buck converter to charge the battery.

In the converter 200 of FIG. 2, during battery discharge mode, the current through the eight primary side switches and their associated free-wheeling diodes are the result of "incoming" currents through inductors 232, 234, 236 and 238 and "outgoing" currents to the transformers 206 and 208. The resulting current waveforms through the primary side switches and their free-wheeling diodes are complex. FIG. 7B shows typical current waveforms in one primary leg of the converter 200. The waveforms include current waveform 706 for the inductor 232, current waveform 708 for the transformer 206, current waveform 710 for the switch 216, current waveform 712 for the diode across switch 216, current waveform 714 for the switch 226, and current waveform 716 for the diode across switch 226. Currents will be slightly different between the legs as transformer current will have different timing compared to boost inductor current.

In the converter 200, for all four primary-side legs, and under high-power discharge mode, the dominant losses are in switches 218, 222, 226 and 230 closest to the midpoint. The free-wheeling diodes across these switches carry no current in discharge mode and therefore have no losses. The "outer" switches 216, 220, 224 and 228 and their associated diodes carry much less current than switches 218, 222, 226 and 230 as there is no net transport of power into or from the DC bus. Further, there is no switching loss in the "outer" switches 216, 220, 224 and 228. Accordingly, the only switching losses under discharge mode (besides some minor recovery loss of "outer" diodes) are in the "inner" switches 218, 222, 226 and 230. The dominant part of these losses is the turn-off loss as most IGBT's have more $E_{off}$ than $E_{on}$ per Ampere. In addition, the turn-off loss is greater than the turn-on loss because the turn-off current typically will be 1.5 to 2 times the turn-on current due to inductor ripple current. In some embodiments this would result in turn-off losses being 3-4 times higher than turn-on losses.

The turn-off losses discussed above are addressed by an improved embodiment using an added passive circuit to reduce these losses. The reduction of losses in improved embodiments of converters reduces the cooling constraints of the converters allowing smaller heat-sinks and/or fans or to be used, and may allow a reduction of battery size and simpler requirements for ventilation or cooling at an installation site.

Figure 8:
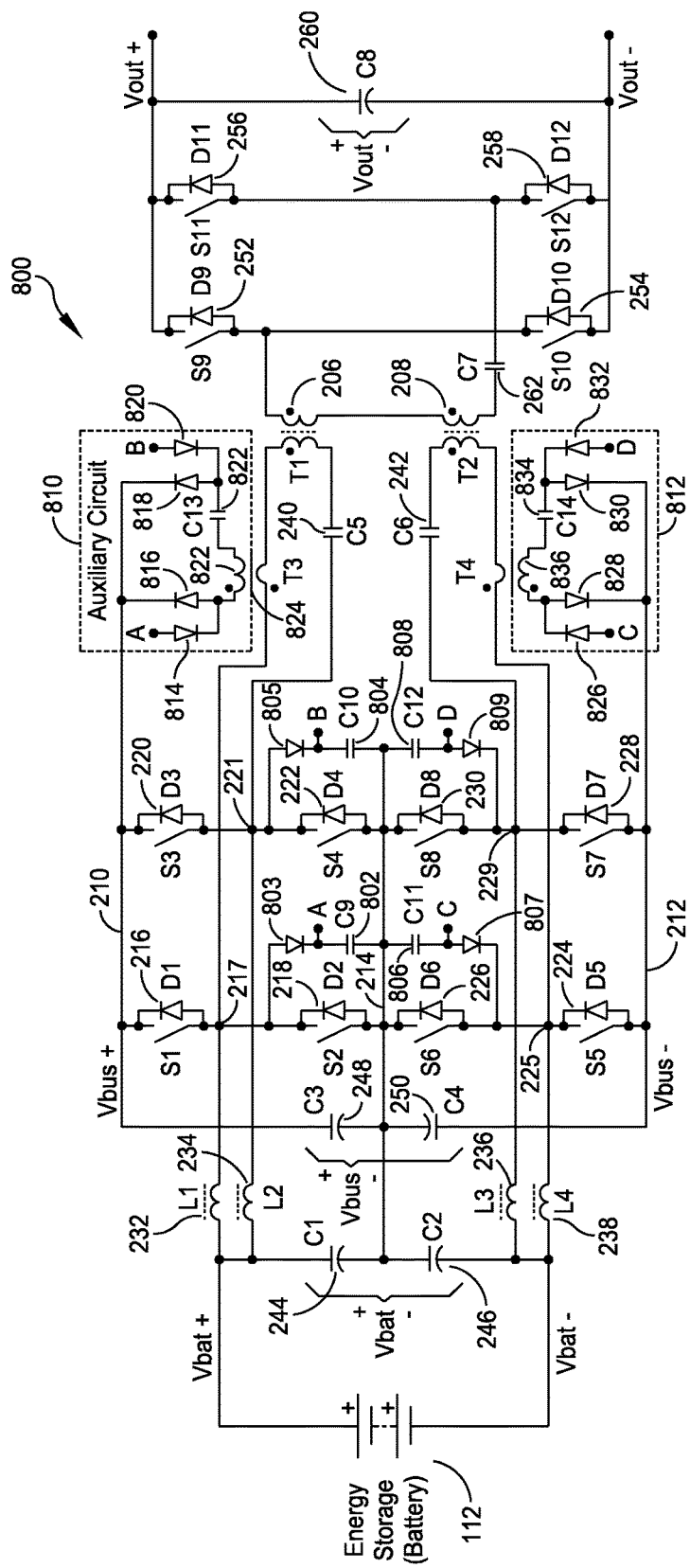
FIG. 8 is a schematic diagram of a DC-DC converter in accordance with one embodiment.

FIG. 8 shows a converter 800 that is similar to converter 200 but has added circuitry to provide reduced losses. In the converter 800, the components that are common to converter 200 are labeled with the same reference numbers. The added components include four sets of diode/capacitor clamps that include capacitors 802, 804, 806 and 808 and diodes 803, 805, 807 and 809 placed across the four "inner" switches 218, 222, 226 and 230, and two auxiliary circuits 810 and 812. Auxiliary circuit 810 includes diodes 814, 816, 818 and 820, capacitor 822 and a transformer 824. Diode 814 has one end coupled between capacitor 802 and the diode of switch 218, and the other end of diode 814 is coupled to a first side of the primary of transformer 824. Diode 820 has one end coupled between capacitor 804 and the diode of switch 222, and the other end of diode 814 is coupled through capacitor 822 to a second side of the primary of transformer 824. Diode 816 is coupled between the first side of the primary of transformer 824 and bus 210. Diode 818 is coupled between the second side of the primary of transformer 824 through capacitor 822 and bus 210. The secondary of transformer 824 is coupled in series with the primary of transformer 206.

Auxiliary circuit 812 includes diodes 826, 828, 830 and 832, capacitor 834 and a transformer 836. Diode 826 has one end coupled between capacitor 806 and the diode of switch 226, and the other end of diode 826 is coupled to a first side of the primary of transformer 836. Diode 832 has one end coupled between capacitor 808 and the diode of switch 230, and the other end of diode 826 is coupled through capacitor 834 to a second side of the primary of transformer 836. Diode 828 is coupled between the first side of the primary of transformer 836 and bus 212. Diode 830 is coupled between the second side of the primary of transformer 836 through capacitor 834 and bus 212. The secondary of transformer 836 is coupled in series with the primary of transformer 208.

In the converter 800, the obtained reduction of turn-off loss depends on the chosen capacitor size for capacitors 802, 804, 806 and 808 versus turn-off current. In one embodiment the capacitors 802, 804, 806 and 808 are sized to reduce dV/dt from having a typical value for converter 200 of 6-10 kV/uS for 600V IGBT's to a value of 1 to 1.5 kV/uS in the converter 800. The capacitor and auxiliary circuits are implemented to be as low-inductive as possible, and in one embodiment are mounted very close to the switches 218, 222, 226 and 230 to reduce the inductance of the circuits.

In operation of the converter 800, when one of switches 218, 222, 226 and 230 turns off the associated clamp capacitor (one of capacitors 802, 804, 806 and 808) gets charged from ≈0V to $V_{bus}/2$. The discharge of each of the capacitors 802, 804, 806 and 808 back to zero volts is driven passively by one of transformers 824 and 836. During one polarity of transformer current two of the four clamp capacitors are discharged, and during the opposite polarity of transformer current the other two clamp capacitors are discharged. The series capacitors 822 and 834 eliminate some voltage imbalance on the secondary side of current transformers 824 and 836 caused by timing differences between switching patterns of the legs compared to timing of the transformer current. In one embodiment, capacitors 822 and 834 are at least an order of magnitude larger than the value of clamp capacitors 802, 804, 806 and 808.

In one embodiment, current transformers 824 and 836 use core materials suitable for the operating frequency (16 kHz in one embodiment) of the converter 800 such as ferrite. Their turn ratio (or number of secondary turns) in at least one embodiment is determined based on the following design trade-off. Using a low turn-ratio generates higher secondary-side current from the current transformers 824 and 836 allowing them to completely reset (discharge) the clamp circuits even under low load condition. However, a low turn-ratio leads to a higher insertion voltage drop in the primary circuit and to a larger VA-size of the current transformers 824 and 836. In one embodiment, the turn-ratio is set as high as possible, and in one embodiment is 1:50, allowing complete discharging of capacitors 802, 804, 806 and 808 when the converter load is approaching 100% e.g. for load >80%.

The resulting voltage waveforms 904 and 908 across clamp capacitors 802 and 804 in the converter 800 are shown in FIG. 9 along with the voltage waveforms 902 and 906 across the corresponding switches 218 and 222, and the current waveform for the transformer 206. Similar voltage waveforms will result in the components on the negative side of the converter 800.

In converters 200 and 800 described above, two transformers 206 and 208 are used. In other embodiments, the two transformers can be replaced by a single transformer having two primary windings and a single secondary winding. Further, in another embodiment, each of the primary windings of transformers 206 and 208 can be coupled between one positive and one negative leg rather than between two positive legs or two negative legs. Further, for use with other input and output voltages, the transformers 206 and 208 can have a turn-ratio other than 1:1.

Figure 10:
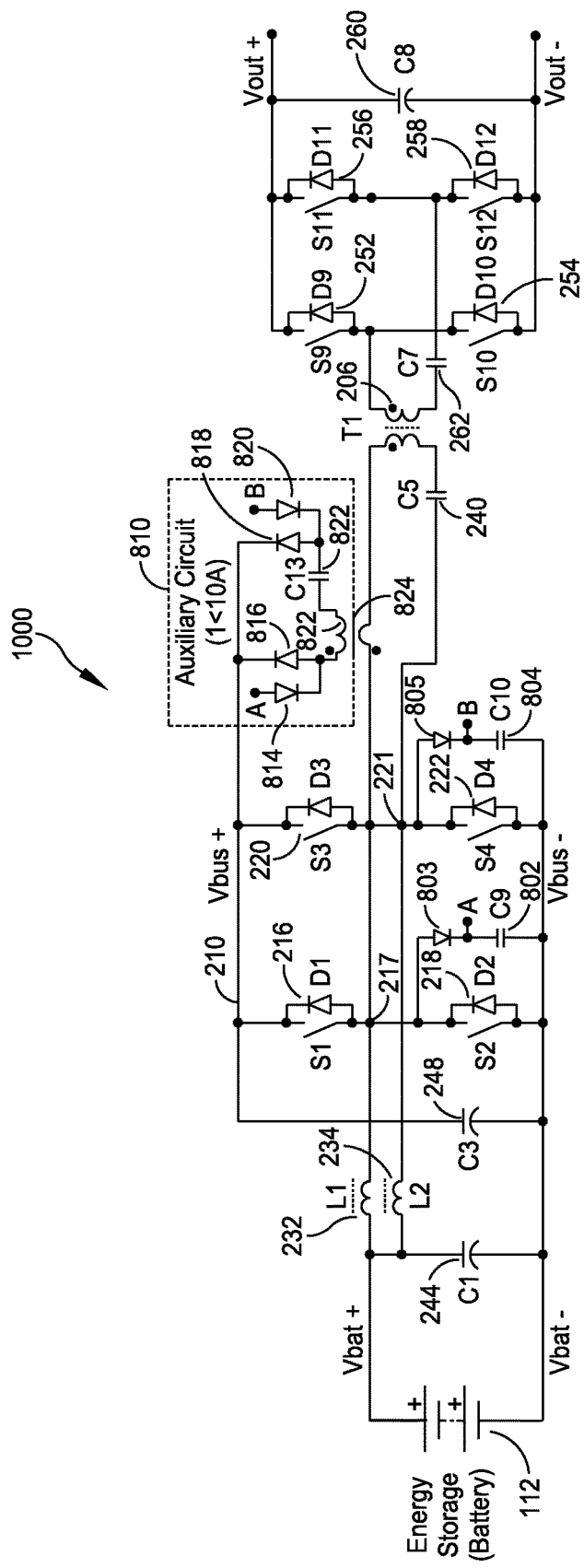
FIG. 10 is a schematic diagram of a DC-DC converter in accordance with one embodiment.

In one embodiment, the topology of the converter 800 discussed above, is replaced by a converter 1000 shown in FIG. 10. The converter 1000 is similar to converter 800 and similar components are labeled with the same reference numbers. The converter 1000 differs from converter 800 in that it does not include the split DC bus, but rather includes only the positive portion of converter 800 coupled between the positive and negative sides of the battery. In the converter 1000 a lower voltage battery may be used than in converter 800, or if the same battery voltage is used, higher voltage switches may be used. Converter 1000 includes one auxiliary circuit of the auxiliary circuits of converter 800 and two of the clamp capacitors. In another embodiment, a converter may be provided that is similar to converter 1000 but does not include the clamp capacitors and auxiliary circuit.

Figures 11A, 11B, 11C:
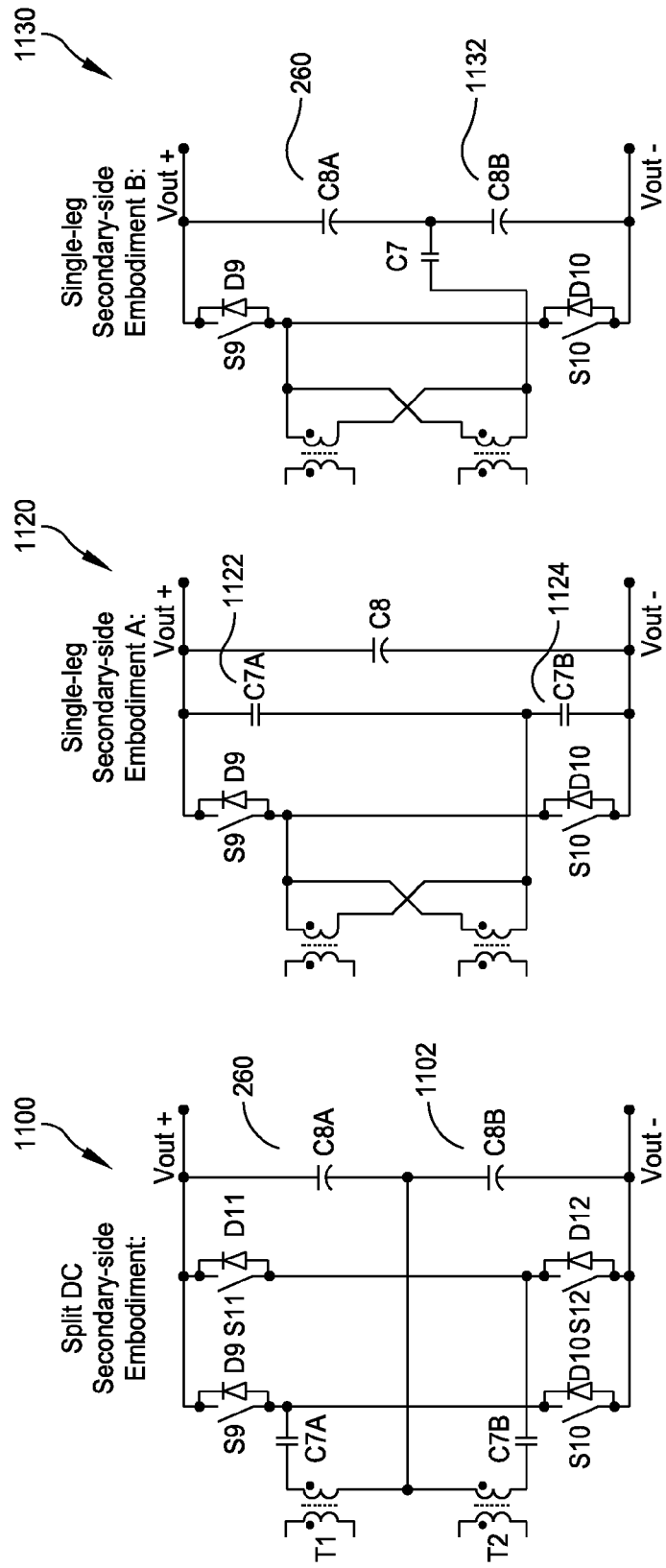

In a number of different embodiments shown in FIGS. 11A, 11B, 11C, 11D, 11E and 11F, the secondary side of the converters discussed above may be replaced by other secondary circuits. FIG. 11A shows a secondary circuit 1100 that provides a split DC bus on the secondary side. The secondary circuit 1100 includes all of the components of secondary circuit 204 of converter 200, except resonant capacitor 262, and the components of secondary circuit 1100 are labeled using the same reference numbers as secondary circuit 204. The secondary circuit 1100 includes an additional capacitor 1102 coupled in series with capacitor 260 to create a midpoint for the output DC bus. The midpoint is also coupled to a midpoint between the two transformers 206 and 208. The resonant capacitor 262 of secondary circuit 204 is replaced by two resonant capacitors 1104 and 1106 in secondary circuit 1100.

FIG. 11B shows a secondary circuit 1120 that may be used in place of the secondary circuit 204. The secondary circuit 1120 is similar to secondary circuit 204 and the same components of secondary circuit 1120 are labeled with the same reference numbers as in secondary circuit 204. In secondary circuit 1120, the transformers 206 and 209 are coupled in parallel and the secondary circuit 1120 includes only one output leg with transistors 252 and 254. In the secondary circuit 1120, resonant capacitor 262 of secondary circuit 204 is replaced by two resonant capacitors 1122 and 1124.

FIG. 11C shows a secondary circuit 1130 that may be used in place of the secondary circuit 204 to provide a split DC bus at the output. In secondary circuit 1120, the transformers 206 and 209 are coupled in parallel and the secondary circuit 1120 includes only one output leg with transistors 252 and 254. The secondary circuit 1130 includes an additional capacitor 1132 coupled in series with capacitor 260 to create a midpoint for the output DC bus. The midpoint is also coupled to a midpoint between the two transformers 206 and 208 through resonant capacitor 262.

FIGS. 11D, 11E and 11F show three embodiments of secondary circuits 1140, 1150 and 1160 that generate double the voltage at the output over that of secondary circuit 204. The ability to provide twice the output voltages allows fewer converters employing these secondary circuits to be needed in series in power systems such as an uninterruptible power supply.

Secondary circuit 1140 provides a split DC bus on the secondary side. The secondary circuit 1140 includes all of the components of secondary circuit 204 of converter 200, and the components of secondary circuit 1140 are labeled using the same reference numbers as secondary circuit 204. The secondary circuit 1140 includes an additional capacitor 1142 coupled in series with capacitor 260 to create a midpoint for the output DC bus. The midpoint is also coupled to a midpoint between transistors 254 and 256.

FIG. 11E shows a secondary circuit 1150 that may be used in place of the secondary circuit 204. The secondary circuit 1150 is similar to secondary circuit 204 and the same components of secondary circuit 1150 are labeled with the same reference numbers as in secondary circuit 204. The secondary circuit 1150, includes only one output leg with transistors 252 and 254. In the secondary circuit 1150, resonant capacitor 262 of secondary circuit 204 is replaced by two resonant capacitors 1152 and 1154.

FIG. 11F shows a secondary circuit 1160 that is similar to secondary circuit 1150 and the same components are labeled with the same reference numbers. Secondary circuit 1160 differs from secondary circuit 1150 in that secondary circuit 1160 is configured with a split DC bus and includes only one resonant capacitor 262. In the circuit 1160, capacitor 260 is replaced by two capacitors 1162 and 1164.

Various aspects and functions described herein in accord with the present disclosure may be implemented as hardware, software, firmware or any combination thereof. Aspects in accord with the present disclosure may be implemented within methods, acts, systems, system elements and components using a variety of hardware, software or firmware configurations. Furthermore, aspects in accord with the present disclosure may be implemented as specially-programmed hardware or software.

Any of the preceding embodiments can be implemented within a UPS, for example, a UPS having a DC battery as a backup power source. The UPS may be configured to provide backup power for any number of power consuming devices, such as computers, servers, network routers, air conditioning units, lighting, security systems, or other devices and systems requiring uninterrupted power. The UPS may contain, or be coupled to, a controller or control unit to control the operation of the UPS including any of the converters described herein. For example, the controller may provide pulse width modulated (PWM) signals to each of the switching devices for controlling power conversion functions. In general, the controller controls the operation of the UPS and converters such that they charge the battery from an AC power source when power is available from the AC power source, and invert DC power from the battery when the AC power source is unavailable or during brown-out conditions. The controller can include hardware, software, firmware, a processor, a memory, an input/output interface, a data bus, and/or other elements in any combination that may be used to perform the respective functions of the controller.

In the embodiments described above, a battery is used as a backup power source. In other embodiments, other AC or DC backup sources and devices may be used including fuel cells, photovoltaics, DC micro turbines, capacitors, an alternative AC power source, any other suitable power sources, or any combination thereof. In embodiments of the invention that utilize a battery as a backup power source, the battery may be comprised of multiple batteries of cells coupled in parallel or in series.

In one or more of the preceding embodiments, the switching devices may be any electronic or electromechanical device that conducts current in a controlled manner (e.g., by using a control signal) and can isolate a conductive path. Representations of various switching devices, and other electronic devices, in the figures are exemplary and not intended to be limiting, as it will be appreciated by one skilled in the art that similar or identical functionality may be obtained using various types, arrangements, and configurations of devices. For example, one or more of the switching devices may contain one or more anti-parallel diodes, or such diodes may be separate from the switching devices. As indicated above, in some embodiments, the switching devices include a rectifier, for example, a controlled rectifier that can be turned on and off with the application of a control signal (e.g., an SCR, a thyristor, etc.). Additionally, other devices, such as resistors, capacitors, inductors, batteries, power supplies, loads, transformers, relays, diodes, and the like may be included in a single device, or in a plurality of connected devices.

In the embodiments described above, converter circuits are described for use with uninterruptible power supplies, although it should be appreciated that the circuits described herein may be used with other types of power supplies and power systems.

Embodiments of the present invention may be used with uninterruptible power sources having a variety of input and output voltages and may be used in single phase or multi-phase uninterruptible power supplies.

Having thus described several aspects of at least one example, it is to be appreciated that various alterations, modifications, and improvements will readily occur to those skilled in the art. Such alterations, modifications, and improvements are intended to be part of this disclosure, and are intended to be within the scope of the examples discussed herein.

Accordingly, the foregoing description and drawings are by way of example only.

What is claimed is:

1. A converter comprising:
   an input to receive an input voltage having an input voltage value; an output; a first voltage bus; a midpoint;
   a first transformer having a primary and a secondary;
   a first circuit coupled to the input, coupled between the midpoint and the first voltage bus and coupled to the primary of the first transformer;
   an output circuit coupled to the secondary of the first transformer and coupled to the output; and
   a control circuit coupled to the first circuit and configured to control the first circuit to provide an AC voltage at the primary of the first transformer, wherein the control circuit is configured to generate control signals to control switches of the first circuit using a modified triangular waveform, wherein the modified triangular waveform does not follow a triangular shape over a complete cycle of the waveform, wherein the modified triangular waveform has slope values including at least a positive slope and a negative slope.

2. The converter of claim 1, further comprising:
   a second voltage bus;
   a second transformer having a primary and a secondary;
   a second circuit coupled to the input, coupled between the midpoint and the second voltage bus and coupled to the primary of the second transformer;
   wherein the secondary of the second transformer is coupled to the output circuit, and wherein the control circuit is coupled to the second circuit and configured to control switches of the second circuit using a modified triangular waveform.

3. The converter of claim 2, wherein the control circuit is configured to control the converter in a recharge mode of operation to generate a DC voltage at the input from a DC voltage at the output.

4. The converter of claim 2, wherein each of the first circuit and the second circuit includes a plurality of switch legs coupled between one of the first voltage bus and the second voltage bus and the midpoint.

5. The converter of claim 4, wherein each of the first transformer and the second transformer has a one to one turn ratio.

6. The converter of claim 5, wherein an output DC voltage at the output is equal to twice the voltage from the first voltage bus to the midpoint.

7. The converter of claim 4, wherein each of the plurality of legs includes an outer switch and an inner switch, with a capacitor coupled across each inner switch, and wherein the converter further includes at least one passive discharge circuit coupled to at least one capacitor coupled across an inner switch, wherein the discharge circuit is configured to discharge the capacitor and reduce a turn-off loss associated with the inner switch.

8. The converter of claim 2, wherein the output includes a positive output, a negative output and a midpoint.

9. A voltage conversion method comprising:
   receiving at an input an input DC voltage, the input DC voltage having a voltage value;
   creating a second voltage from the input voltage at a first voltage bus;
   generating a plurality of control signals using a modified triangular waveform, wherein the modified triangular waveform has at least three slope values during a positive portion of a waveform cycle, wherein the modified triangular waveform has slope values including at least a positive slope and a negative slope;
   creating a first AC voltage from the second voltage using a first plurality of switches by controlling each of the first plurality of switches using one of the plurality of control signals;
   providing the first AC voltage at a primary of a first transformer; and
   generating an output voltage at an output from an AC voltage at a secondary of the first transformer.

10. The method of claim 9, further comprising:
    creating a third voltage from the input voltage at a second voltage bus;
    creating a second AC voltage from the third voltage using a second plurality of switches by controlling each of the second plurality of switches using one of the plurality of control signals;
    providing the second AC voltage at a primary of a second transformer; and
    generating an output voltage from an AC voltage at a secondary of the second transformer.

11. The method of claim 10 further comprising configuring the first plurality of switches as a plurality of switch legs coupled between the first voltage bus and a midpoint, and configuring the second plurality of switches as a plurality of switch legs coupled between the second voltage bus and the midpoint.

12. The method of claim 11, wherein each of the first transformer and the second transformer has a one to one turn ratio.

13. The method of claim 11, further comprising providing a DC voltage at the output having a DC voltage value equal to twice the voltage from the first voltage bus to the midpoint.

14. The method of claim 11, wherein each of the plurality of legs includes an outer switch and an inner switch, with a capacitor coupled across each inner switch, and wherein the method further includes discharging each capacitor of each inner switch to reduce a turn-off loss associated with each inner switch.

15. The method of claim 9, further comprising coupling a battery to the input and providing a voltage at the battery to charge the battery using the first plurality of switches from an input voltage at the output.

16. The method of claim 9, wherein the output includes a positive output, a negative output and a midpoint, and the method further includes providing a first output voltage from the positive output and the midpoint, and providing a second output voltage from the midpoint to the negative output.

17. A converter comprising;
    an input to receive an input voltage having an input voltage value;
    an output to provide an output voltage;
    a first voltage bus having a DC bus voltage value;
    a midpoint;
    a first transformer having a primary and a secondary;
    a first circuit coupled to the input, coupled between the midpoint and the first voltage bus and coupled to the primary of the first transformer;
    an output circuit coupled to the secondary of the first transformer and coupled to the output; and means for controlling the first circuit to generate a three level voltage waveform at the primary of the first transformer over a range of input voltage values using a modified triangular waveform, wherein the modified triangular waveform does not follow a triangular shape over a complete cycle of the waveform, wherein the modified triangular waveform has slope values including at least a positive slope and a negative slope.

18. The converter of claim 17, wherein the range of input voltage values extends from a value equal to 0.3 times the DC bus voltage value and 0.7 times the DC bus voltage value.

19. The converter of claim 17, further comprising means for operating the converter in a recharge mode of operation to generate a DC voltage at the input from a DC voltage at the output.

20. The converter of claim 17, wherein the first circuit includes a plurality of switch legs coupled between the first voltage bus and the midpoint, wherein each of the plurality of legs includes an outer switch and an inner switch, with a capacitor coupled across each inner switch, and wherein the converter further includes means for discharging the capacitor and for reducing a turn-off loss associated with the inner switch.

* * * * *